United States Patent [19]
Massie

[11] Patent Number: 5,596,944
[45] Date of Patent: Jan. 28, 1997

[54] BOAT TRAILER MARKING DEVICE

[76] Inventor: Richard A. Massie, H.C. 1 Box 188, Forsyth, Mo. 65653

[21] Appl. No.: 254,365

[22] Filed: Jun. 6, 1994

Related U.S. Application Data

[63] Continuation-in-part of Ser. No. 7,069, Jan. 21, 1993, abandoned, and a continuation-in-part of Ser. No. 152,194, Nov. 12, 1993, abandoned.

[51] Int. Cl.$^6$ .................. B60Q 1/50; G08B 21/00
[52] U.S. Cl. .................. 116/28 R; 116/202; 116/229; 340/431
[58] Field of Search .................. 116/28 R, 202, 116/229; 33/264; 280/414.1, 477; 340/431

[56] References Cited

U.S. PATENT DOCUMENTS

| | | | |
|---|---|---|---|
| 2,143,997 | 1/1939 | Parkinson | 33/264 |
| 2,594,885 | 4/1952 | Due . | |
| 2,815,732 | 12/1957 | Majors | 116/28 R |
| 2,934,011 | 5/1961 | Hamilton | 116/28 R |
| 3,015,162 | 1/1962 | Bohnet | 116/28 R |
| 3,064,617 | 11/1962 | Meagher | 116/28 R |
| 3,520,273 | 7/1970 | Daifotes | 116/28 R |
| 3,585,582 | 6/1971 | Dove | 340/52 |
| 3,657,695 | 4/1972 | Birmingham | 340/431 |
| 3,774,149 | 11/1973 | Bennett | 340/431 |
| 3,821,699 | 6/1974 | Marus et al. | 340/59 |
| 3,863,594 | 2/1975 | Gawthrop | 116/28 R |
| 3,995,251 | 11/1976 | Jones | 340/59 |
| 4,598,339 | 7/1986 | Ainsworth | 116/28 R |
| 4,778,957 | 10/1988 | Crowell . | |
| 4,940,251 | 7/1990 | Willmsen | 280/414.1 |
| 4,958,436 | 9/1990 | Tusche | 116/28 R |
| 5,097,250 | 3/1992 | Hernandez | 340/431 |
| 5,161,769 | 11/1992 | Coulthard | 116/28 R |

FOREIGN PATENT DOCUMENTS

| | | | |
|---|---|---|---|
| 1212435 | 3/1960 | France | 116/34 R |

Primary Examiner—William A. Cuchlinski, Jr.
Assistant Examiner—John L. Beres
Attorney, Agent, or Firm—Haverstock, Garrett and Roberts

[57] ABSTRACT

A boat trailer marking device capable of automatic deployment from and redeployment to a protected and recessed position out of sight and unobstructed which includes an elongated element pivotally attached to a mounting means wherein the elongated element includes an extension arm with visible means on the outer extremity and a weight arm which preferably includes a spring assist adapted to rotate the boat trailer marking device into vertical position for marking and tracking the movement and location of a boat trailer from a towing vehicle and for gauging the depth of the water when the boat trailer is in position on a boat ramp for loading a boat and for locating and targeting the center of the submerged boat trailer while loading the boat.

12 Claims, 7 Drawing Sheets

BOAT TRAILER MARKING DEVICE

This is a continuation-in-part of Massie U.S. patent application Ser. No. 08/007,069, filed Jan. 21, 1993, now abandoned, and a continuation-in-part of Massie U.S. patent application Ser. No. 08/152,194, filed Nov. 12, 1993 now abandoned.

FIELD OF THE INVENTION

The present invention relates to a boat trailer marking and tracking device for providing a visible target means for indicating the location and proper positioning of an empty boat trailer from a towing vehicle with respect to a dock or loading ramp, and for indicating the depth of the water covering the trailer and location of the submerged trailer to permit and facilitate easy retrieval of the boat from a body of water.

BACKGROUND OF THE INVENTION

Boat trailer guiding devices for use in launching and retrieving boats are known. One such device is disclosed in U.S. Pat. No. 4,940,251 wherein a pivot device is actuated by a water scoop which picks up water when the boat trailer and boat are backed into the water on a boat ramp and which drains out when the boat trailer and device are removed from the water. This device would be cumbersome to use, difficult to attach and unpredictable in its employment. Also, there is no means for signaling the depth of water surrounding the boat trailer on the boat ramp so it would almost invite possible damage when loading large boats in an inadequate depth of water.

Another device is shown in U.S. Pat. No. 5,097,250 which discloses a rather complicated electronic system which includes a hitch sensor and sending device, a water sensor and sending device, a pair of tilt sensors and signal sending devices and a flotation sender and sending device, all coupled into a control box panel in the cab of the towing vehicle.

Other trailer marking devices are shown in U.S. Pat. No. 3,064,617 and U.S. Pat. No. 3,863,594. The boat trailer marking device of this invention offers many advantages over those shown in the prior art.

SUMMARY OF THE INVENTION

The boat trailer marking device of this invention has an elongated arm with an extension arm and a signal, which may be a flag, lights or florescent paint strips on one end of the pivoted arrangement and a weight on the other end. The device is pivotally attached to a mounting memos and is adapted to be mounted on the axle or frame of a boat trailer. When the boat is in place on the trailer, the marking device will be deactivated and stored out of sight in a position roughly parallel with the bottom of the boat and resting in contact against the bottom of the boat. Optionally, the signal extension arm may be locked in place for transportation over the road or highway.

An optional light at the top of the signal end of the extension arm may be activated by means of a switch and powered by a battery or a wire hookup integrated into the trailer lighting system when the device is rotated into an upright indicating position. The invention may include a depth marking attachment built into the trailer marking device.

As the boat trailer is backed into the water to unload the boat, and as the boat is backed off of the trailer into the water, the trailer marking device gravitationally rotates into the upright position, showing the exact location of the trailer. In this upright and visible position the trailer can be located and tracked by the operator of the vehicle towing the trailer as it is subsequently moved back onto the boat loading ramp. Additionally, the device remaining in its upright position by the counter weight mechanism provides a visible and prepositioned target for the boat operator to use to guide the boat back onto the submerged and largely invisible trailer. Preferably, a pair of marking devices located toward the center rails of the boat trailer are used to show the exact location of the trailer, particularly when it is dark, although use of a single marking device is adequate for many boat trailers and boats, particularly smaller boat trailers and boats.

Through a series of lights such as green, yellow, red and amber at staggered places on the signal arm to indicate water depths as well as position of the boat trailer, it is possible to load even rather large boats not only in daylight but also during darkness.

DETAILED DESCRIPTION OF THE PREFERRED EMBODIMENT

In the detailed description, like reference numbers are used to identify the like components in each of the figures.

Figures 1, 2:
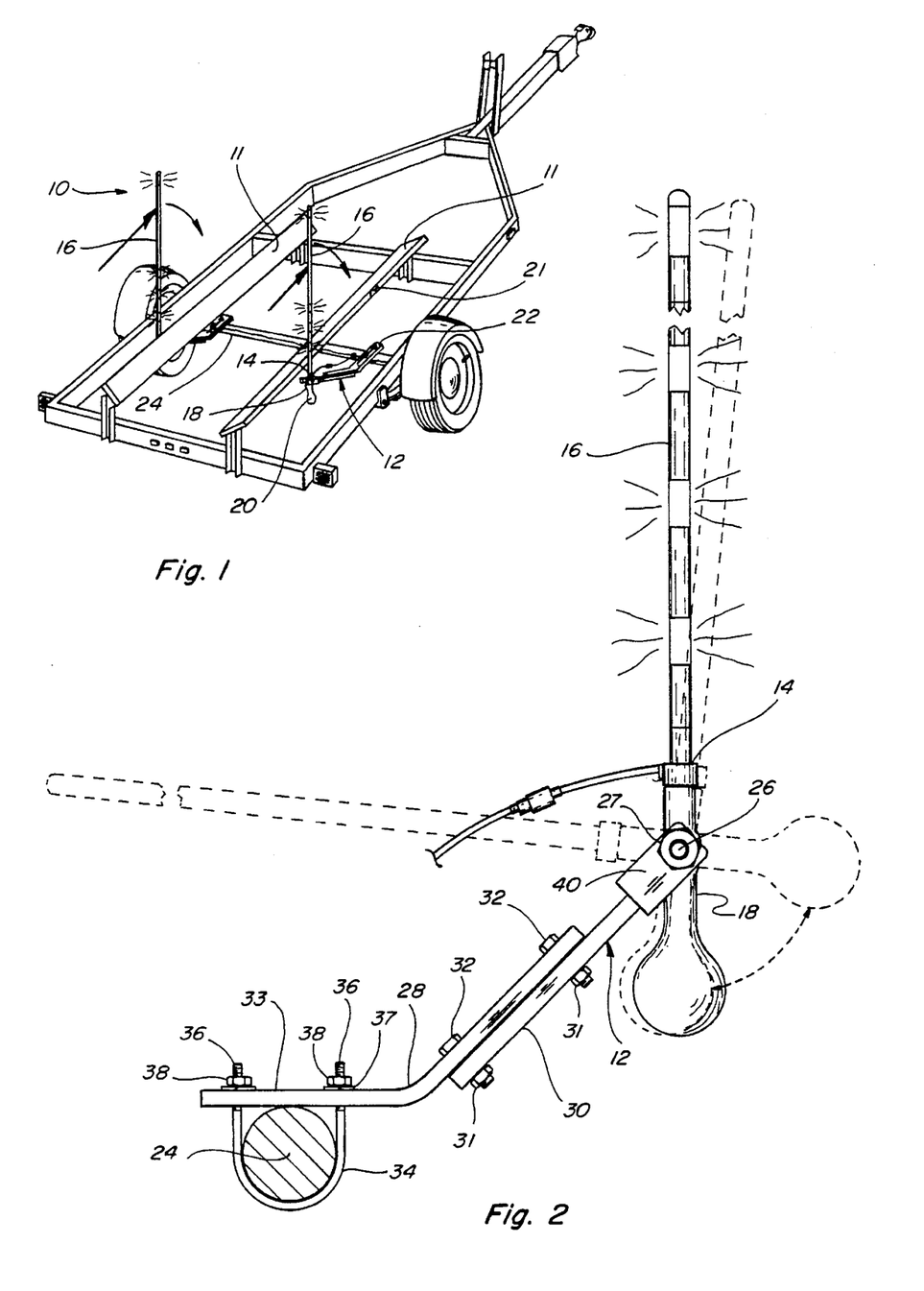
FIG. 1 is a perspective view of a boat trailer with a pair of boat trailer marking devices of the present invention in place.
FIG. 2 is a partial side view of the boat trailer marking device shown in FIG. 1.

FIG. 1 shows boat trailer 10 with trailer rails 11 and a pair of boat trailer marking devices 12 secured in place on boat trailer 10 with elongated element 14 in an activated vertical position, such as occurs after a boat (not shown) has been removed from boat trailer 10. Elongated element 14 includes extension arm 16 and weight arm 18 with weight attached thereto. In an alternative embodiment, elongated element 14 may be of one piece construction. Mounting device 22 is shown attached to axle 24 of boat trailer 10 but mounting could also be achieved on a portion of the trailer frame or rails (skids or bunks).

A boat trailer with one or a plurality of marking devices of the present invention operates in the following manner. When a boat is loaded onto a trailer, the marking devices are rotated down or forward and secured and stored out of sight in a horizontal position by contact with the boat hull as it moves forward onto the trailer. As the boat is unloaded at the water's edge at a boat ramp, the boat trailer marking devices gravitationally rotate into an upright, vertical position. The counter weight maintaining the elongated element in an upright position resists all counter forces exerted by the changes in trailer angle, wind or water. When the boat is later to be remounted, the visible extension arms aid in the tracking and positioning of the trailer down the boat ramp and provide a prepositioned target for the boat operator loading the boat back onto the submerged trailer. In addition, the varied colored or modified portions of the extension arms act as a visual depth indicating means to accurately indicate the depth of the water at the boat trailer to aid in positioning the trailer on the ramp at an optimum depth sufficient for rapid remounting of the boat without damaging the submerged hull on the ramp or trailer frame as could happen if the ramp, trailer or boat is improperly positioned.

FIG. 2 shows a partial side view of boat trailer marking device 12. Elongated element 14, including extension arm 16 and weight arm 18 includes pivot attachment 40, such as pivot pin 26 and nut 27 which is adapted to hold elongated element 14 in pivotal relationship with pivot attachment 40 of mounting device 22. FIG. 2 also shows elongated element 14 in silhouette in a more vertical position or in horizontal position when a boat is in place on boat trailer 10 and alternatively held horizontal by a latching device 21.

Mounting device 22 includes angled upper extension arm 28 and lower extension arm 30 which are held in by-passing extendable relationship by a plurality of bolts 32 and nuts 31. Outer extremity 33 of upper extension arm 28 includes U-shaped bracket 34 constructed of a universal U-bolt which extends through openings in upper extension arm 28 which include threaded ends 36 adapted to be tightened, along with washers 37 about boat trailer axle 24 by means of a plurality of bracket nuts 38. Such an extendable two-part mounting device allows better adaptation and fit to the wide variety of boats and trailers commercially available.

Figure 3:
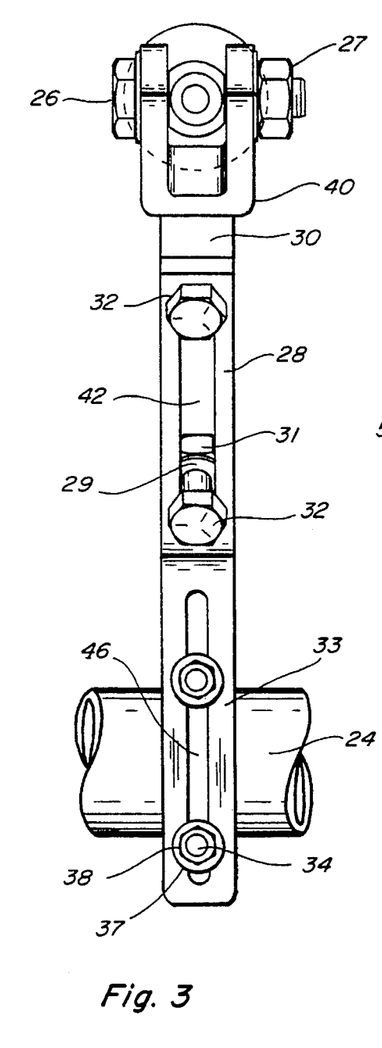
FIG. 3 is a top elevational view of the mounting device shown in FIG. 2.

In FIG. 3, pivot pin 26 with nut 27 is shown secured in pivotal relationship with a pivot attachment 40. Pivot attachment 40 is shown as a U-shaped bracket, but other means of securing a pivot pin are also possible. Upper extension arm 28 is shown held in extendable position with lower extension arm 30 and secured by fastening means such as by bolts 32, washers 29 and nuts 31. Bolts 32 operate in upper extension arm slot 42 which cooperates with a companion slit in lower extension arm 30 to provide the basis for lengthwise adjusting boat trailer marking device 12 for various sized trailers and boats. Upper extension arm 28 is held in place about trailer axle 24 by U-shaped bracket 34 held tightly in place by means of washers 37 and bracket nuts 38 on the upper extensions of U-shaped bracket 34. Bracket 34 is adapted to adjustably operate in bracket slot 46 in order to further adapt mounting bracket 22 to various sizes of boat trailer axles.

Figure 4:
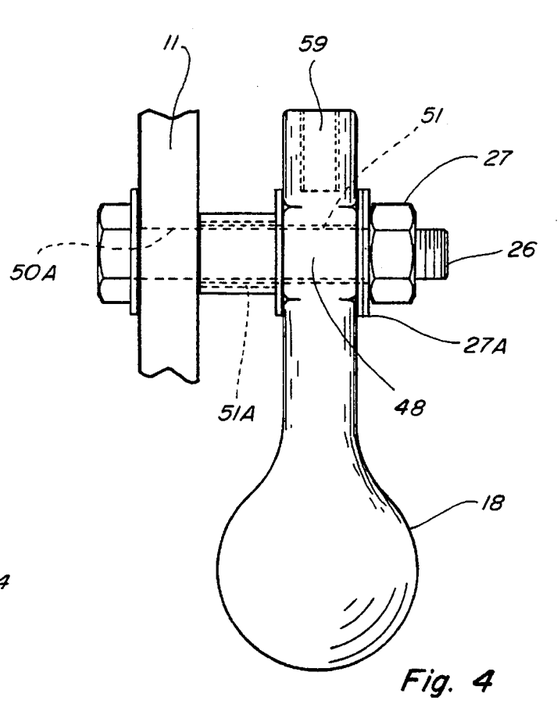
FIG. 4 is an end view of the pivot means.

FIG. 4 shows an end view of the pivoting arrangement wherein pivot pin 26 extends through an opening formed or bored in neck 48 of weight arm 18 and through opening 50A in trailer rail 11 and is secured by nut 27. Pivot pin 26 also secures weight arm 18 with nut 27 and washer 27A so that weight arm 18 rotates around the axis provided by pivot pin 26. The opening formed or bored through neck 48 allows for direct mounting on trailer rail 11 or for attachment to the mounting bracket pivot attachment 40 of the extension arm shown in FIG. 3. Pivot pin 26 also extends through inner spacer 51 projecting through opening in neck 48 in weight arm 18 and abutting the outer surface of trailer rail 11 and the inner surface of washer 27A and nut 27. Outer spacer 51A separates weight arm 18 from the outer surface of the trailer rail 11 and inner surface of weight arm 18. Such spacers provide for positive free rotation of weight arm 18 without binding or other interference when pivot pin 26 is mounted and held in place by nut 27. Weight arm 18 successfully counter balances the weight of elongated element 14 to automatically raise marking extension arm 16 activated by the force of gravity when a boat is removed from a boat trailer, and hold the tracking/marking element in the upright and visible position until moved back into the horizontal position and secured by the recumbent boat hull or manually clipped to the trailer frame, e.g. by latching device 21. Thus, the boat trailer marking device of this invention may be attached to a boat trailer by direct attachment to a trailer rail (skid or bunk) as best shown in FIG. 4 or by an extendible mounting device best shown in FIGS. 2 and 3.

Figures 5, 6, 7:
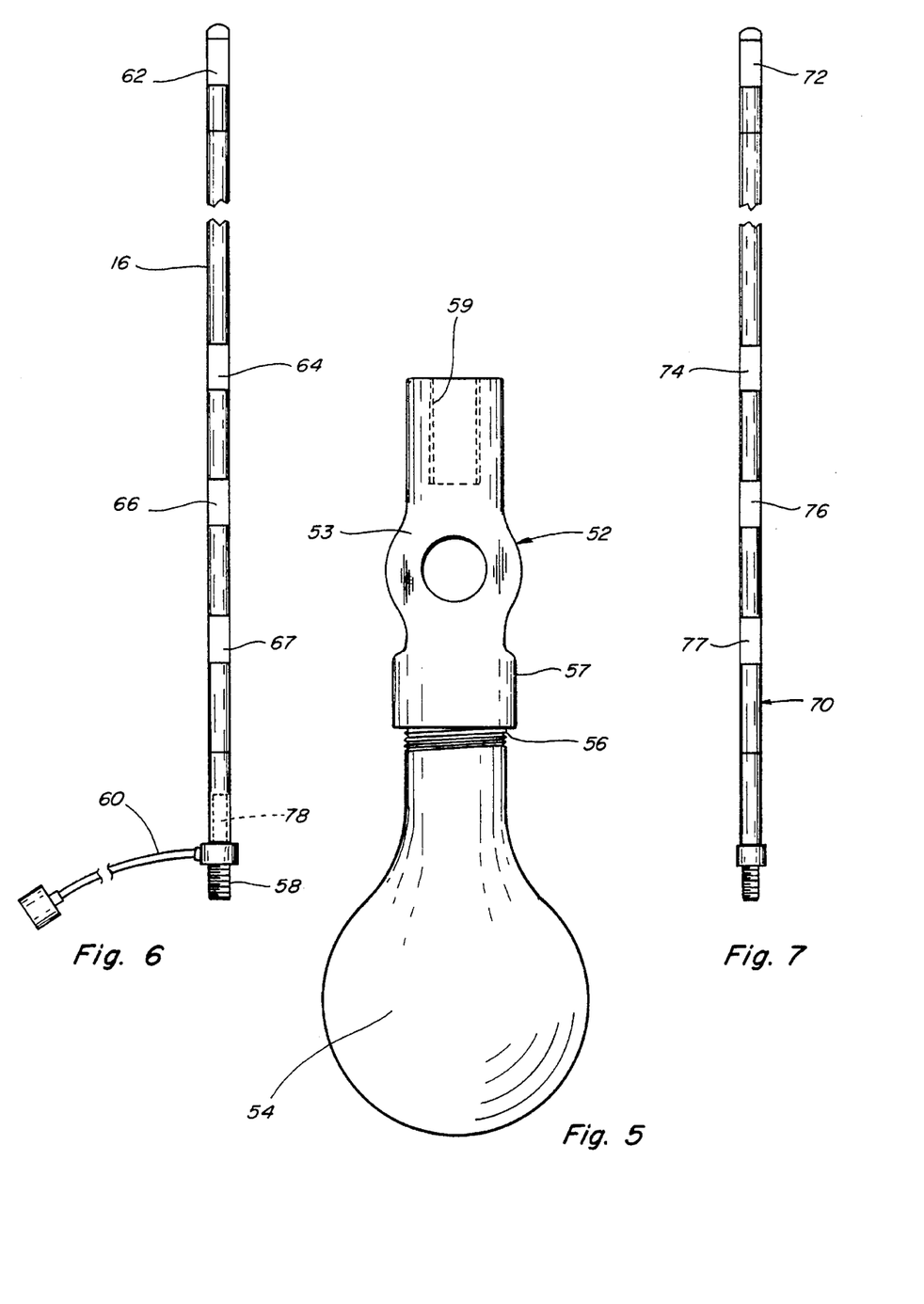
FIG. 5 is a front view of one embodiment of the weight arm with a pivot pin opening.
FIG. 6 is a side view of one embodiment of the extension arm of this invention.
FIG. 7 is a side view of an alternative embodiment of the extension arm of this invention.

FIG. 5 shows alternative weight arm 52 showing threadably detachable alternative weight 54 with male threads 56 on the upper extension of detachable alternative weight 54 adapted to mate with female threads 57 on the lower portion of pivot portion 53. With this construction, alternative weight 54 can be removed and exchanged for heavier or lighter weights to accommodate rotating and balancing a longer or shorter extension arm 16 (not shown in FIG. 5).

FIG. 6 shows a preferred embodiment of extension arm 16 which is removably adapted to fit into elongated element 14 (not shown in FIG. 6) by means of extension arm male threads 58 which are adapted to mate with companion female threads 59 built into alternative weight arms 18 and 52. See FIG. 4 and FIG. 5, respectively. The extension arm 16 preferred embodiment shown in FIG. 6, can be made of hollow construction to accommodate signal lights 62, 64, 66, and 67 and a wiring harness to activate signal lights via electrical connection 60. For illustrative purposes, the signal lights may consist of upper red light 62, middle white light 64, lower green light 66 and amber light 67. Obviously, any arrangement of lights and numbers of lights may be used in the practice of this invention. Also, the color of the lights is relatively unimportant except that the lights should be visible from some distance in the dark because the purpose of signal lights 62, 64, 66, and 67 is to line up the boat for remounting onto the boat trailer and to indicate the depth of the water over the boat trailer.

A preferred power source is a 12-volt electrical system which can be hooked into and operated off the towing vehicle 12-volt electrical system. Alternative systems include lights activated by independent dry cell batteries such as a 9-volt dry cell battery. Also, other satisfactory embodiments include the use of light emitting diodes (LEDs) which require very little power for activation.

In order to automatically actuate and deactivate the lights when the elongated element 14 is changed from a horizontal to a vertical position and back to a horizontal position, upon removal or mounting of a boat, respectively, it is desirable to include a switch 78 such as a mercury switch in the electrical connections. Also, it is within the scope of this invention to utilize a solid extension arm 16 with external wiring and the lights surface mounted on extension arm 16, instead of integrally formed therein. Further, each light may be operated from a separate switch which may be individually activated to show the depth of the water.

FIG. 7 is alternative extension arm 70 which is similar to extension arm 16 shown in FIG. 6 except that it is of a solid construction wherein red section 72 is painted with red luminescent paint, white section 74 is painted with white luminescent paint, green section 76 is painted with green luminescent paint and amber section 77 is painted with amber luminescent paint, for illustrative purposes. Again, obviously any arrangement of colored sections may be used, and such colors may be imparted by means other than paint. In addition, signal devices such as flags or other indicators can be attached and/or incorporated at the upper portion of the extension arms. Also, reflective coatings may be applied to the surface of such extension arms.

An alternative preferred embodiment for the construction of the mounting bracket and light activation mechanism is shown in FIGS. 8 through 11.

Figure 11:
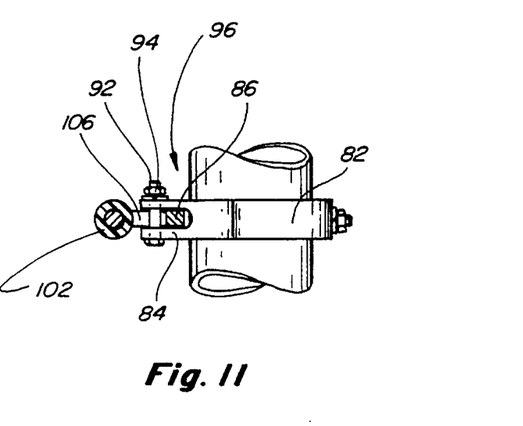
FIG. 11 is a cross sectional view of the mounting device of the embodiment shown in FIG. 9, taken along the 11—11 line.

The mounting device, generally designated 80 includes a U-shaped bracket 34 for mounting to the trailer axle as described above. The bracket 34 extends through and is bolted to one end of an angled extension arm 82. The end of extension arm 82 opposite the end to which bracket 34 is attached is of a U-shaped mounting construction 84 for accepting support bar 86 as seen in FIG. 11. Support bar 86 includes an aperture 88 at one end and a machined receiving well 90 at the opposite end.

Support bar 86 is secured to extension arm 82 by a pin 92 and bolt 94 assembly generally designated 96. Assembly 96 allows the extension arm 82 to be secured at various position along support bar 86, thereby providing better adaptation and fit to a wide variety of boats and trailers. In this embodiment, extension arm 82, support arm 86 and bracket 84 are constructed of conductive material, e.g. a metal such as iron or steel.

One end 98 of support bar 86 is pivotally secured to elongated element 14 by a pivot attachment generally designated 110.

Figures 8, 10:
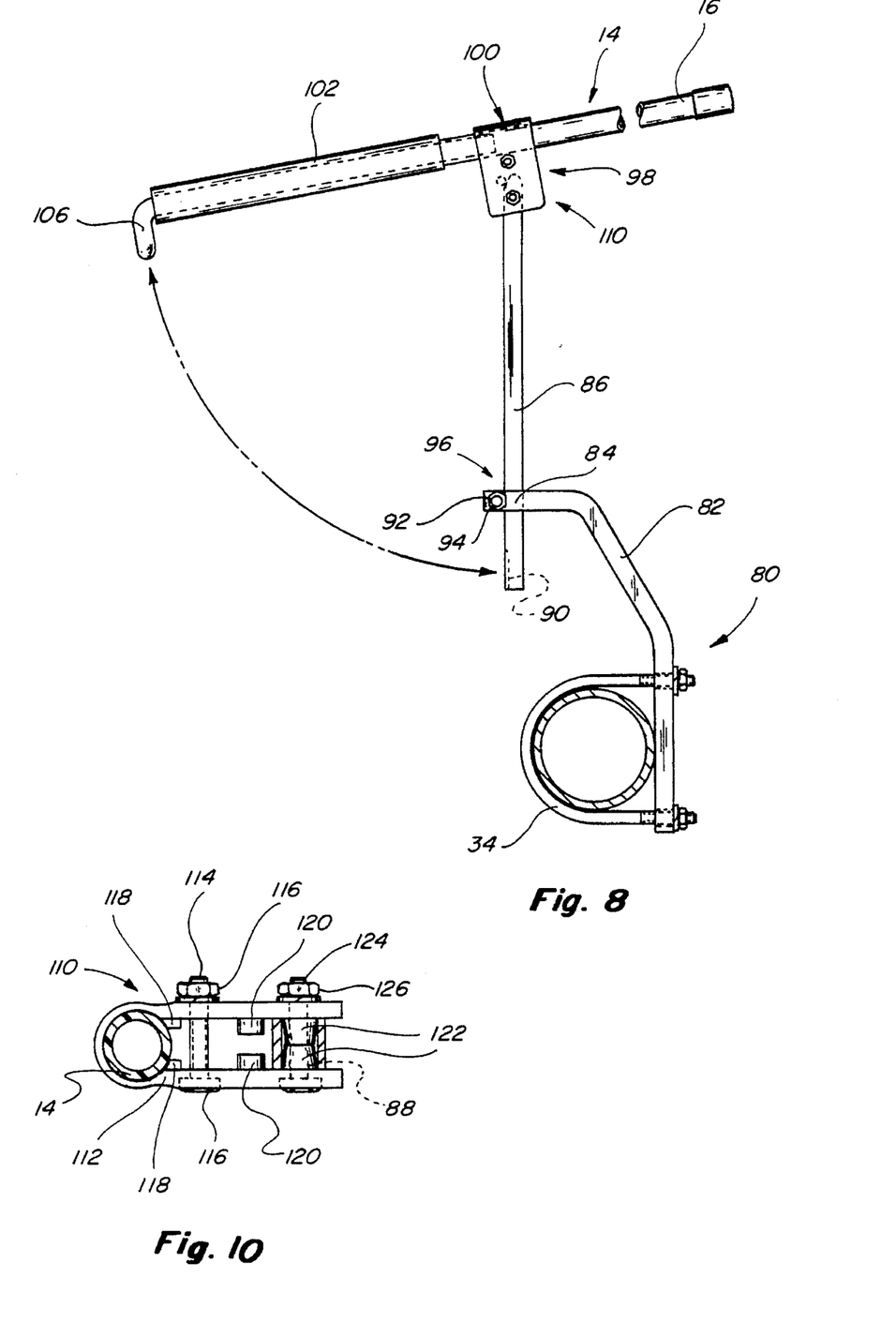
FIG. 8 is a side view of an alternative embodiment of the extension arm bracket, illustrating the invention in the deactivated or storage position.
FIG. 10 is a cross sectional view of the pivot assembly of the embodiment shown in FIG. 9, along the 10—10 line.

Pivot attachment 110, as in FIG. 10 includes a U-shaped body portion 112 having integral projections 118, 120 and 122, and is preferably formed from a durable plastic by injection molding. Body 112 wraps around element 14 and is secured by bolt 114 and nut 116. Body 112 facilitate secure attachment of element 14, and projections 120 act as a stop to prevent over rotation of the elongated element 14 about the pivot point.

Support arm 86 is secured to pivot attachment 110 through aperture 88. Pivot pin 124 extends through hollow projections 122 which have been inserted into aperature 88, as shown in FIG. 10. Projections 122 thereby prevent the bolts from being over tightened. This insures that element 14 is freely pivotable.

The extension arm 16 of elongated element 14 is constructed to include lighting circuitry as disclosed in the embodiments described fully above.

Weight arm 100 of element 14 extends opposite extension 16. Weight arm 100 includes weight 102 to counter balance the weight of extension arm 16 and cause element 14 to move about pivot pin 124 to a vertical position upon removal of the boat from the trailer or release of the securing device (not shown).

A projection 106 of weight arm 100, preferably extending perpendicular to weight arm 100, includes means to ground the lighting circuitry of element 14, thereby closing the circuit and actuating the signal lights. A projection 106 constructed of conductive material with a rounded end is presently preferred.

FIG. 8 illustrates the embodiment in the deactivated position. A weight, for example, the boat on the trailer, has rotated element 14 into its horizontal or secured position. The projection 106 of weight arm 100 is not grounded, as it is free of contact of any conductive material. The light circuit is open and the lights are therefor deactivated.

Figure 9:
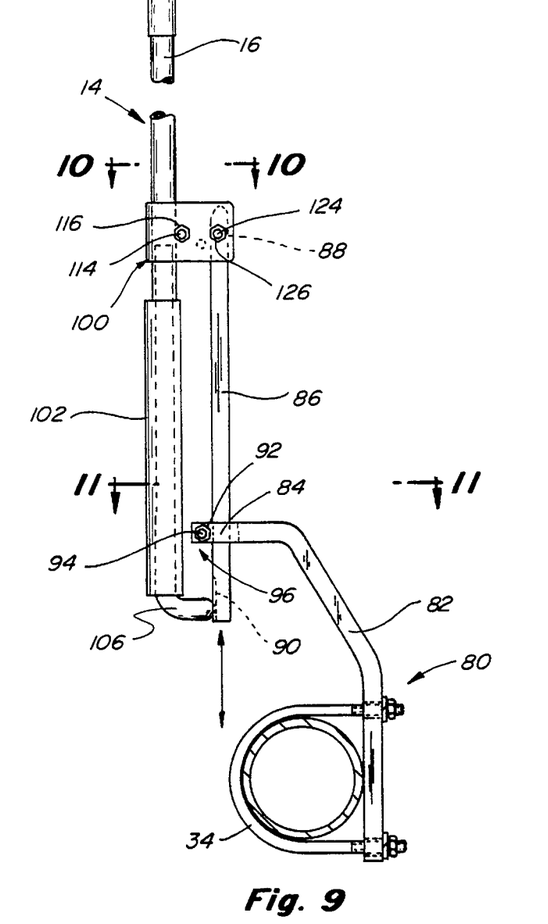
FIG. 9 is side view of the embodiment illustrated in FIG. 8 shown in the activated or upright position.

FIG. 9 illustrates the preferred embodiment in the activated position. Elongated element 14 has rotated into its upright position. Projection 106 of weight arm 100 is in physical contact with support arm 86. In the activated position, rounded end of projection 106 rests in well 90 of support bar 86 to maintain contact. This closes the electrical circuit, causing the light to be activated.

The extension arms of the elongated elements of the boat trailer marking devices of this invention not only serve the desirable function of identifying the location and tracking of the boat trailer from the towing vehicle and providing a stationary predetermined target for guiding the boat operator while motoring the boat onto the submerged trailer, but also identify the depth of the water contacting or covering the trailer bed so that a knowledgeable boat owner can easily float a boat onto the trailer at the optimum position for that particular boat and boat trailer pairing without scraping the bottom of the boat on the trailer superstructure or overshooting the trailer's winching post.

The materials of construction will vary somewhat with the size of the boat trailer marking device necessary to accommodate a particular boat trailer and boat. The extension arms may be of a lightweight construction material, such as formable plastic. Useful plastics include acetal resins, polyamides, vinyl chloride resins, polyolefins such as polypropylene, and other moldable plastics. Strong plastic materials such as polycarbonates and reinforced nylons may also function as extension arms. Also, extension arms may be made from lightweight metals such as aluminum and alloys. It is preferable that the materials of construction be essentially anti-rusting type materials because they will be repeatedly in and out of the water.

Typically, the weight arm will be formed of some form of heavy metal, such as iron, stainless steel or brass and may be sheathed in some form of anti-fouling material such as a polyolefin coating.

Various plastic compositions may be used in preparing pivot attachment 110. Such compositions include acetal resins, polyolefins such as polypropylene and polyethylene, polyamide compositions such as reinforced nylons, acrylonitrile-butadiene-styrene copolymers, polycarbonate compositions, polyester compositions, vinyl compositions and other injection moldable compositions.

Presently preferred plastic compositions useful in making parts for this invention are acetal resins. A particularly useful acetal resin is Delrin 100 ST marketed by E. I. du Pont de Nemours & Co.

Figures 12, 16:
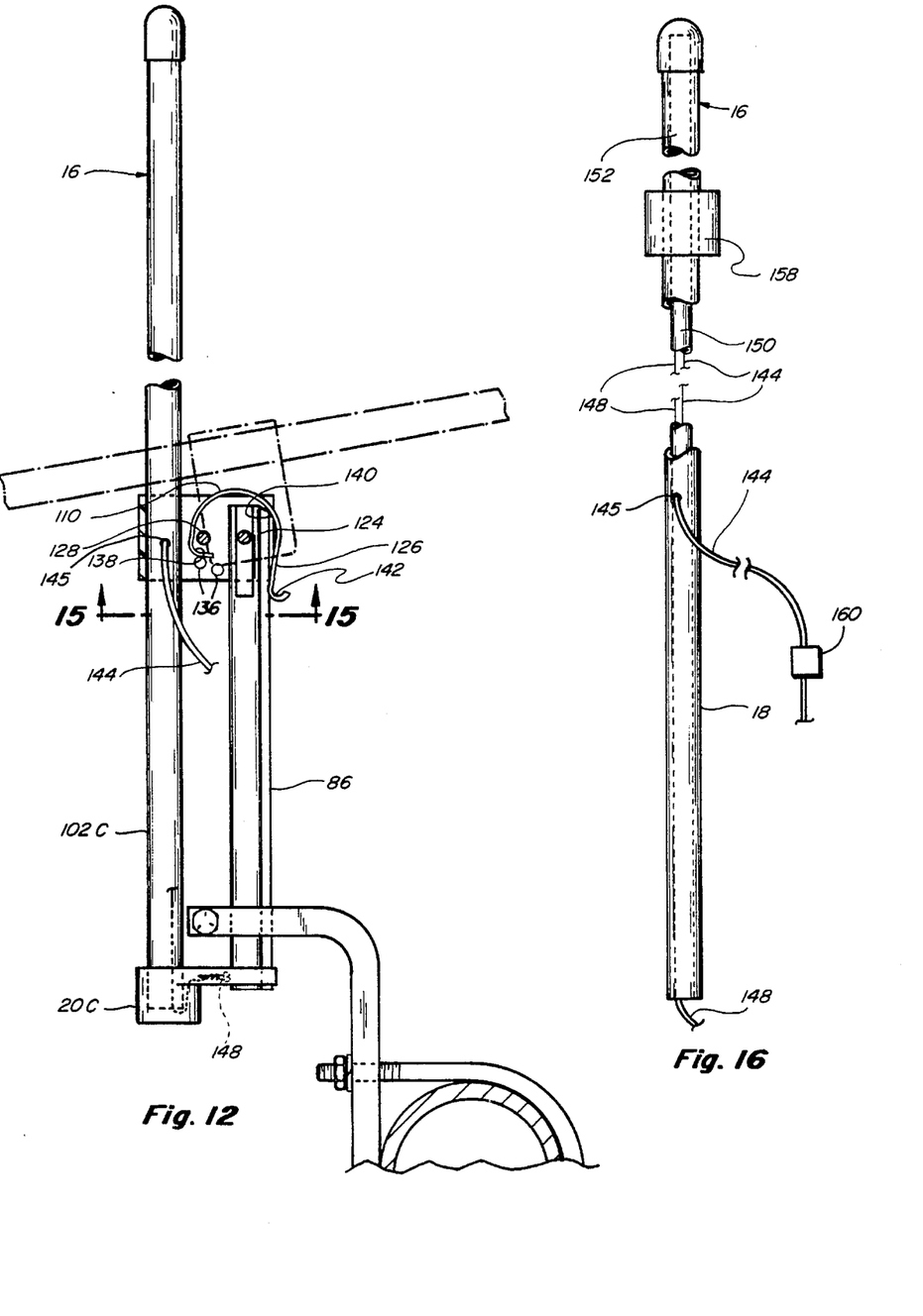
FIG. 12 is a side view of an alternative embodiment of the extension arm bracket, illustrating the invention in the activated or upright position with a spring assist in place.
FIG. 16 is a fragmented section of the preferred elongated element of this invention; and, FIG. 17 is an enlarged partial cross section of the preferred upper extension arm of this invention.

With reference to FIG. 12, spring 126 is held tightly in place on pivot attachment 110 by means of bolt 128. FIG. 12 shows alternate wiring system wherein wire 144 connects from the towing vehicle battery system through opening 145 to connect with the lights in extension arm 16. Annular grounding projection 148 is adapted to ground the system and complete the circuit to light the lights when extension arm 16 is projecting upward by grounding against metal support bar 86. Metal support bar 86 is grounded to axle 24 by mounting device 22. FIG. 12 also shows weight arm 102C and weight 20C which work in cooperation with spring 126 to quickly and easily activate the marking device of this invention. Also, optional alternate switch 160 may be included to deactivate the lighting system from a power source.

Spring 126 is preferably made from C1045 cold rolled steel which has been heat treated and drawn back to a spring steel temper and plated with a cadmium or zinc plating composition. The width of the spring, the thickness of the steel and the length of the spring will be based on the size of the trailer marking device. The flat spring useful for most boat trailer marking devices of this invention will be about 4 inches to 6 inches in length, about ⅓ inch to 1 inch in width and from about 0.025 inch to about 0.050 inch thick.

Figure 13:
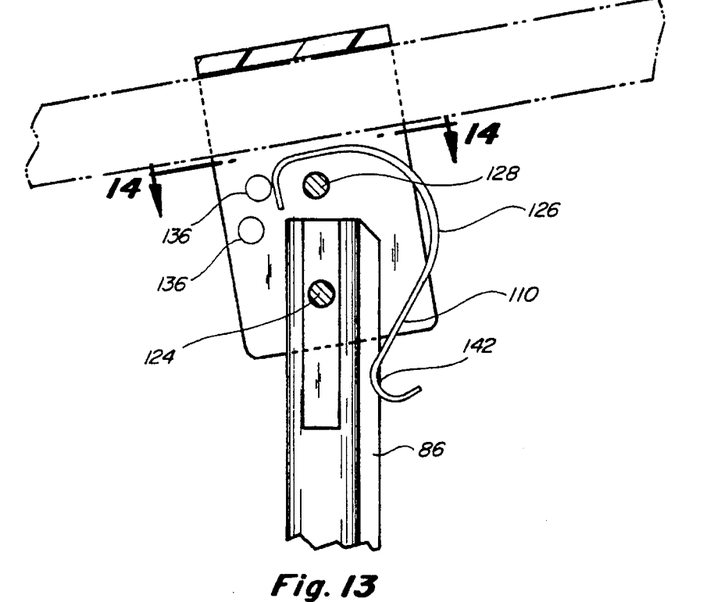
FIG. 13 is a side view of the embodiment illustrated in FIG. 12 shown in the deactivated or storage position.

FIG. 13 is a side view which best shows spring 126 in place in pivot attachment 110. Bend 138 is approximately a 90 degree angle bend which obviously may be significantly more or less than 90 degrees and still accomplish the same result. Preferably, bend 138 is not a complete loop about bolt 128 to make it easier to remove and replace spring 126. Obviously, spring 126 would function as effectively if it were a complete loop about bolt 128 but such loop would require disassembly to replace spring 126.

Sweeping curve 140 in spring 126 provides the spring assist desired in rotating elongated element 14 about pivot pin 124. Spring 126 includes curve 142 which provides a rear sliding surface adapted to slide up and down on the outer surface of support bar 86 when elongated element 14 is rotated into and out of signaling position.

Spring 126 will vary in size depending on the size of boat trailer marking device 12 which will of course be sized to accommodate boat trailer 10 which will obviously be sized to accommodate the boat to be transported and placed in and out of the water. Also, other commercially available spring materials such as Delrin 100 ST acetal resin may be used in making spring 126 The size and thickness of spring 124 will be in accordance with the desired result in the particular marking device 12.

Figure 14:
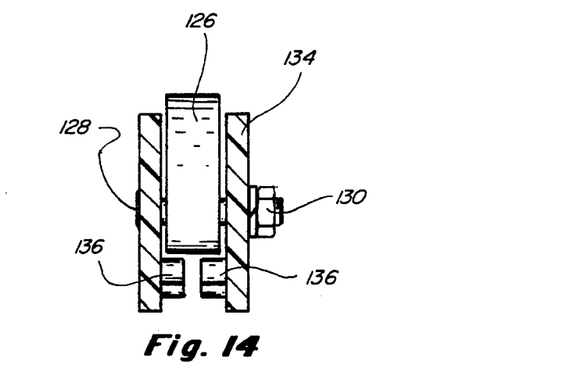
FIG. 14 is a cross section taken along lines 14—14 of FIG. 13.

FIG. 14 is a cross section taken along lines 14—14 of FIG. 13 showing the arrangement which keeps spring 126 in place. Bolt 128 is tightened by nut 130 to hold tightly together extension 132 and companion extension 134 in gripping relationship with spring 126 which keeps it from rotating backward. Projections 136 hold spring 126 in permanent position when extension 132 and companion extension 134 are compressed against spring 126 by bolt 128 and nut 130.

Optionally, spring 126 may be held in working relationship with support bar 86 to avoid any side slippage. For example, support bar 86 may include raised edges to form a working chanel for spring 126. Also, spring 126 may include a notch in curve 142 which could ride on a ridge near the middle of support bar 86. Other means for guiding spring 126 are included. Also, spring 126, preferably flat as discussed herein, may be of any other cross section configuration such as round, oval, etc.

Figure 15:
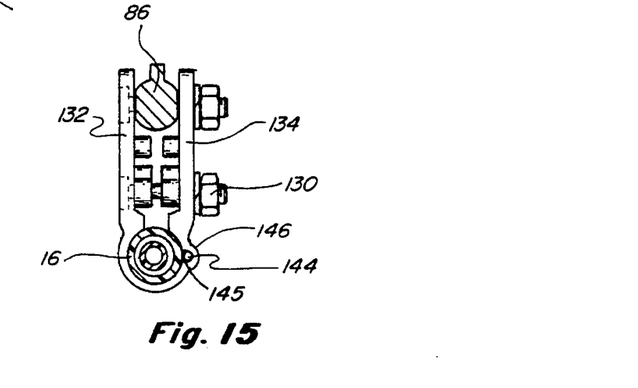
FIG. 15 is a cross section taken along lines 15—15 of FIG. 12.

FIG. 15 is a cross section taken along lines 15—15 of FIG. 12 showing the configuration of marking device 12 when extension arm 16 is in the upright position and activated for use in marking the location of boat trailer 10. FIG. 15 best shows projection 146 on pivot attachment 110 which includes opening 145 to accommodate hot wire 144 which projects downward from extension arm 16 to complete the circuit to activate the lights.

Figure 17:
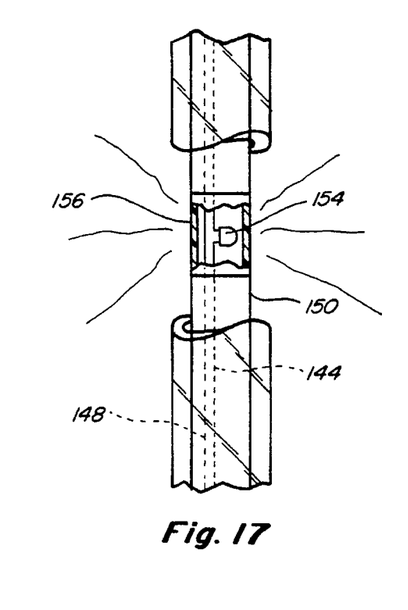

The preferred embodiments of the construction of extension arm 16 and weight arm 18 with details of the preferred lighting system are best shown in FIGS. 16 and 17. In FIG. 16, upper extension arm 16 includes inner plastic tube 150 and outer plastic tube 152. Extending through inner plastic tube 150 is hot wire 144 and ground wire 148. Inner plastic tube 150 may be made from any of the formable resins mentioned herein but is preferably made from a poly vinyl chloride resin material. Outer plastic tube 152 may be made from any of the plastic materials mentioned herein which are transparent or translucent but is preferably made from a transparent polycarbonate resin material. In FIG. 17, light 154 is preferably a light emitting diode which provides adequate light coupled with long life. However, any other light adapted for the available electric current may be used in this invention. Surrounding light 154 is cover ring 156 which is colored to represent the various color signals described herein, thin enough to allow light from light 154 to shine through.

Also, FIG. 16 shows slidable depth gauge 158 which surrounds outer plastic tube 152 in close but slidable relationship. Slidable depth gauge 158 is useful, but not essential, to show the depth of the water over boat trailer 10 when it is in the water in preparation for reloading a boat.

Inner plastic tube 150 which contains the lighting system is placed in easily removable but abutting relationship with outer plastic tube 152. Upper extension arm 16 is inserted into lower weight arm 18 in tight but removable relationship so that the lighting system in inner plastic tube 150 may be easily and quickly replaced if a light becomes defective. Cover rings 156 may be of different colors to provide for light combinations for the signaling device of this combination.

Thus, there has been shown and described novel means for a boat trailer marking device. The present invention fulfills all the objects and advantages set forth above. It will be apparent to those skilled in the art, however, that many changes, modifications, variations and other uses and applications for the subject invention are possible. All such changes, modifications, variations and other uses and applications which do not depart from the spirit and scope of the invention are deemed to be covered by the invention, which is limited only by the claims which follow.

I claim:

1. A boat trailer marking device comprising:

an elongated element, said elongated element attached to a mounting device in pivotal relation therewith at a pivot point in said elongated element, said elongated element having an extension arm projecting from said pivot point, said extension arm having visible means for marking water depth included with said extension arm, said elongated element having a weight arm projecting from said pivot point in the opposite direction from said extension arm, said weight arm having a weight device associated therewith, and a spring associated with said elongated element, said weight arm and said spring adapted to effect rotation of said extension arm into a substantially vertical position.

2. The boat trailer marking device of claim 1 wherein said extension arm includes at least one signal device.

3. The boat trailer marking device of claim 2 wherein said signal device is at least one light.

4. The boat trailer marking device of claim 3 wherein said signal device is a series of signal lights.

5. The boat trailer marking device of claim 4 wherein said series of lights is a series of different colored lights adapted for a 12 volt power system.

6. The boat trailer marking device of claim 4 wherein said series of lights is actuated and deactuated by a switch.

7. The boat trailer marking device of claim 1 wherein said boat trailer marking device is adapted to be mounted on a boat trailer.

8. The boat trailer marking device of claim 1 wherein said extension arm is adapted to be removed and replaced.

9. The boat trailer marking device of claim 1 wherein said spring is adapted for removal an replacement.

10. The boat trailer marking device of claim 1 wherein said extension arm includes a receptacle for a switch.

11. The boat trailer marking device of claim 1 wherein said extension arm contains an opening for electrical conduit.

12. The boat trailer marking device of claim 7 wherein said mounting device is comprised of a pivot point on one end adapted to work with the pivoting of said elongated element, a first sliding unit extending from said pivot point and adapted to mate with a second sliding element, both of said first sliding element and said second sliding element being adapted for attachment to each other, said second sliding element having an angled extension therefrom with a U-joint near the outer extension thereof adapted to fit over the axle of said boat trailer, said mounting device being adapted for extension and shortening.

* * * * *

UNITED STATES PATENT AND TRADEMARK OFFICE
CERTIFICATE OF CORRECTION

PATENT NO. : 5,596,944
DATED : January 28, 1997
INVENTOR(S) : Richard A. Massie

It is certified that error appears in the above-indentified patent and that said Letters Patent is hereby corrected as shown below:

Column 1, line 53, "memos" should be --means--.

Signed and Sealed this

Eighth Day of April, 1997

Attest:

BRUCE LEHMAN

*Attesting Officer*  *Commissioner of Patents and Trademarks*